United States Patent
Chaves et al.

(10) Patent No.: US 8,256,918 B2
(45) Date of Patent: Sep. 4, 2012

(54) NEON-TUBE SUBSTITUTE USING LIGHT-EMITTING DIODES

(75) Inventors: Julio C. Chaves, Madrid (ES); Roberto Alvarez, Glendale, CA (US); William A. Parkyn, Lomita, CA (US); Juan Carlos Minano, Madrid (ES)

(73) Assignee: Light Prescriptions Innovators, LLC, Altadena, CA (US)

( * ) Notice: Subject to any disclaimer, the term of this patent is extended or adjusted under 35 U.S.C. 154(b) by 239 days.

(21) Appl. No.: 12/682,680

(22) PCT Filed: Nov. 13, 2008

(86) PCT No.: PCT/US2008/012809
§ 371 (c)(1),
(2), (4) Date: Apr. 12, 2010

(87) PCT Pub. No.: WO2009/064472
PCT Pub. Date: May 22, 2009

(65) Prior Publication Data
US 2010/0214764 A1    Aug. 26, 2010

Related U.S. Application Data

(60) Provisional application No. 61/003,061, filed on Nov. 14, 2007.

(51) Int. Cl.
*F21V 33/00* (2006.01)

(52) U.S. Cl. ............... 362/216; 362/551; 362/249.02; 362/555; 362/254

(58) Field of Classification Search ............ 362/555, 362/254, 216
See application file for complete search history.

(56) References Cited

U.S. PATENT DOCUMENTS

| | | | |
|---|---|---|---|
| 6,481,882 B1 | 11/2002 | Pojar | 362/559 |
| 6,874,924 B1* | 4/2005 | Hulse et al. | 362/551 |
| 7,157,839 B2 | 1/2007 | Ouderkirk et al. | 313/111 |
| 7,160,012 B2 | 1/2007 | Hilscher et al. | 362/555 |
| 7,350,936 B2 | 4/2008 | Ducharme et al. | 362/231 |
| 7,726,862 B2* | 6/2010 | Lin | 362/555 |
| 7,926,975 B2* | 4/2011 | Siemiet et al. | 362/240 |
| 2001/0048603 A1 | 12/2001 | Ohuchi | 362/555 |
| 2003/0026106 A1* | 2/2003 | Knaack et al. | 362/511 |
| 2005/0237766 A1 | 10/2005 | Klettke | 362/612 |
| 2006/0158896 A1 | 7/2006 | Krupa et al. | 362/555 |

* cited by examiner

*Primary Examiner* — Laura Tso
(74) *Attorney, Agent, or Firm* — Drinker Biddle & Reath LLP

(57) ABSTRACT

A tubular luminaire efficiently utilizes the light of a line of high-brightness unlensed LEDs to reproduce the homogeneous appearance of a neon tube. The transparent tube has an annular cross-section suitable for cost-effective manufacturing by extrusion. The LEDs are mounted in a line on a circuit board that can be positioned either inside or outside the tube. Their light shines into a cylindrical groove, thereby entering within the material of the tube. Above the groove, the wall of the tube has a spiral shape that reflects the light laterally so that it stays within the annular tube for a considerable path length. Volume scattering by a low density of scattering inclusions causes the light to escape as a homogenous glow. Alternatively, mild surface scattering from the inside surface can be used.

14 Claims, 11 Drawing Sheets

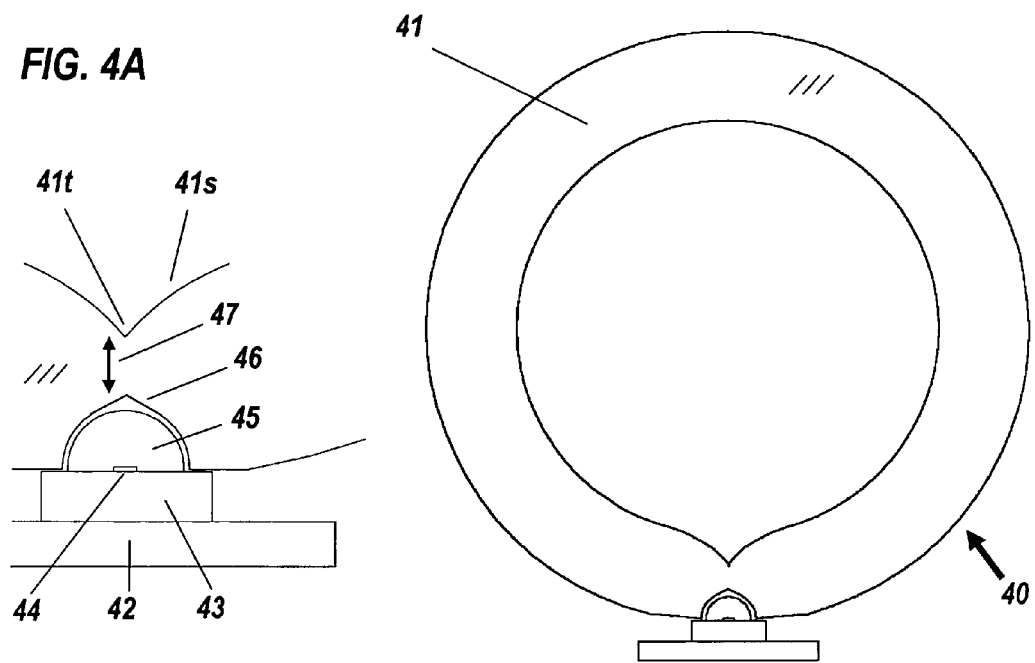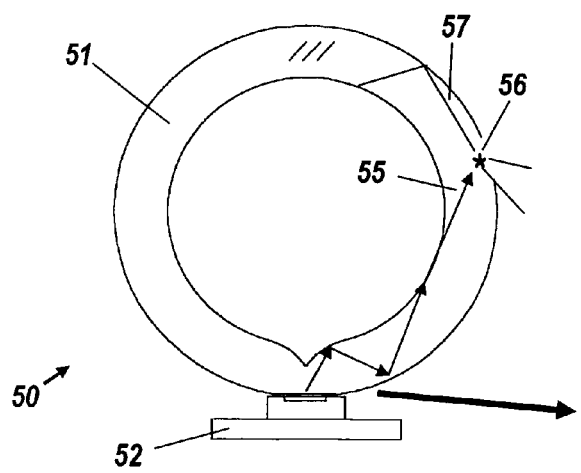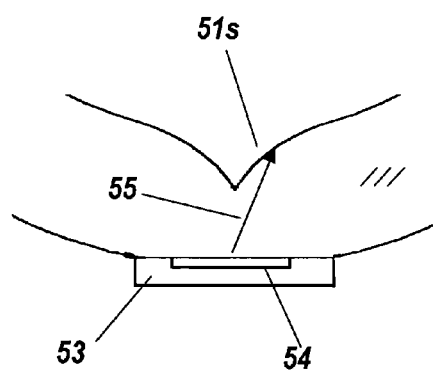

NEON-TUBE SUBSTITUTE USING LIGHT-EMITTING DIODES

BACKGROUND OF THE INVENTION

The present invention relates generally to illumination and more particularly to LED-based tubular substitutes for the neon lamp. The neon lamp is a venerable and ubiquitous accent light with such technological maturity that no significant improvements are in sight, but with such fragility and high operating voltage (>15,000 V) as to pose inescapable risks. For example, fragility is so high that long-distance shipping is not economical due to inevitable breakage, and thus most lamps are custom-produced locally by small businesses, precluding the economies of mass production. Of societal significance is the relatively low efficacy of neon lamps, leading to excessive power consumption. Furthermore, neon lamps are volume emitters, leading to their perceived brightness being proportional to the length of the viewer's line of sight through the cylinder. Thus they are highly non-uniform spatially and directionally.

Fluorescent tubes have uniform brightness but lack neon's color purity.

LEDs have better efficacy and can generate white light of selectable color temperature, light of higher color purity than fluorescent tubes, or programmably multicolored light, with great improvements in safety, robustness, and operating life as compared with neon technology. Recent gains in the luminosity and operating lifetime of light-emitting diodes (LEDs) make them attractive candidates to replace neon light sources, especially considering their robustness and low operating voltage. The prior art includes numerous ways of end-firing LEDs into long runs of plastic illumination fibers, typically 0.5-1 inch (12 to 25 mm) diameter. This sets rather low limits on the output brightness of the fiber.

Relative to the size of neon lamps, however, LEDs are point sources, so that their light must be somehow spread out along a tubular structure so as to reproduce the look of neon. The end-fired cylindrical lights of the prior art, such as U.S. Pat. No. 6,488,397 by Matsutani & Ishiharata are limited in the amount of light that can be injected into them, which limits their length as well, if they are to equal or surpass the luminance of neon lamps. Also, many illumination fibers are made of elastomeric material, so that their lack of rigidity requires frequent support to prevent unsightly sagging. Finally, the diameter of such solid fibers is limited by weight considerations.

In the recent prior art, U.S. Pat. No. 7,048,413 by Fan discloses a round scattering layer above a line of bullet-lens LEDs. This approach however, is not a true tube-emitter like neon, since its light shines only out the front part of the device. Also, the bullet-lens LEDs it utilizes represent an older configuration that is optically inefficient and generally of lower efficacy than the more recent high-brightness LED configurations utilized in the present application. U.S. Pat. No. 6,834,979 by Cleaver et al is similar in its approach and limitations.

U.S. Pat. No. 6,874,924 by Hulse & Chambers discloses an annular cylindrical structure cut so as to allow side injection of light, again by bullet-lens LEDs, but also including an interior partially reflecting scattering layer. U.S. Pat. No. 6,497,496 by Wang also utilizes a non-waveguiding annular cylinder with radially directed light sources and opposing holes. U.S. Pat. No. 6,676,284 by Wilson also has an annular cylinder, but it is merely a diffusing cover illuminated by a line of centrally located, closely spaced light sources.

U.S. Pat. No. 7,277,618 by Yamazaki, et al discloses a conventional optical fiber impregnated with phosphor and end-fired by blue LEDs. Impregnating the waveguide itself with phosphor would make it difficult to attain uniformity of either brightness or whiteness, because blue light is being converted to yellow as it propagates down the fiber, so that its strength weakens and the local fiber emission diminishes and alters color.

There is a great need for a superior LED-based neon substitute that can utilize the latest high-brightness LEDs (which are not available in the thermally inefficient bullet lenses mention above).

SUMMARY OF THE INVENTION

One embodiment of the present invention comprises means to inject light at spaced intervals and means to assure luminance-uniformity, an important requirement when using high-brightness LEDs, since their cost motivates a relatively wide spacing (several tube diameters) between them. This relatively distant spacing is quite unlike the prior art as discussed above, which utilizes a large number of closely spaced low-brightness LEDs, because of their low cost. The cost per lumen of the low-brightness LEDs, however, is much greater than for high-brightness LEDs, hence the need for optics capable of utilizing widely spaced light sources.

According to an embodiment of the invention, there is provided a tubular luminaire comprising a line of discrete light sources and a cylindrical transparent annular waveguide. The waveguide comprises a receiving zone, which zone receives the light of the sources so as to admit the light within the transparent material of the annular waveguide. The waveguide comprises an ejector to promote the homogeneous escape of the light from the waveguide.

The discrete light sources may be LEDs or other punctuate sources.

In an embodiment, the cylindrical transparent annular waveguide has an outer surface that is a right circular cylinder, or an arc of such a cylinder, so that light once reflected by total internal reflection (TIR) within the waveguide will be repeatedly reflected by TIR and will travel around the cylinder until it is ejected by another process. The outer surface may be a complete cylinder, a cylinder complete except for one or more sections specially shaped for injection of light into the waveguide, or a lesser arc. In an embodiment, the cylindrical waveguide is slightly less than a semicircle, with light being injected at one end. An almost complete circular cylinder may then be formed by two such waveguides back to back.

Embodiments of the present invention disclose methods of side-firing of unlensed high-brightness LEDs into a tubular annulus. The annulus is typically lighter in weight than a solid tube of the same external diameter, which is advantageous in many uses. Nearly all of the light from a line of LEDs is injected into an annular waveguide. Suitable extraction methods are well known for ejecting this guided light out of the tube. They can be classified as surface or volume scattering. In both cases, not all the scattered light gets immediately out of the tube, since some remains trapped inside the annulus by total internal reflection until again scattered. This helps to smooth out the luminous appearance of the tube as externally viewed, which is advantageous in many uses. In fact, luminous uniformity is often of such high importance that without it no amount of robustness, efficacy, longevity, or low costs will make up for its lack. The human eye is most pleased by luminance uniformity of accent lights, and is intolerant of luminance gradients beyond a fairly low threshold. Embodiments of the present invention make it possible to obtain this uniformity. Moreover, the tubular neon substitute of embodiments of the present invention comprises a hollow rigid tube that will not sag or require great structural support, and can be economically extruded out of a plastic material such as acrylic.

In addition to the uniform luminance exhibited by neon tubes, other types of output are possible with further embodiments of the present invention. The small size of LEDs relative to a tubular embodiment makes it possible for collimated light to be produced by coordinated specular ejection, which preserves the LED's luminance. Diffuse ejection, used by some preferred embodiments, precludes such collimation.

BRIEF DESCRIPTION OF THE DRAWINGS

The above and other aspects, features and advantages of the present invention will be more apparent from the following more particular description thereof, presented in conjunction with the following drawings wherein:

FIG. 4 shows a cross-section of an alternative injector configuration with greater minimum thickness than FIG. 3.

FIG. 4A is a detail of FIG. 4, to a larger scale than FIG. 4.

FIG. 5 shows a cross-section of an outside-fired annular waveguide for undomed LEDs.

FIG. 5A is a detail of FIG. 5, to a larger scale than FIG. 5.

DETAILED DESCRIPTION OF THE PREFERRED EMBODIMENTS

Figure 1:
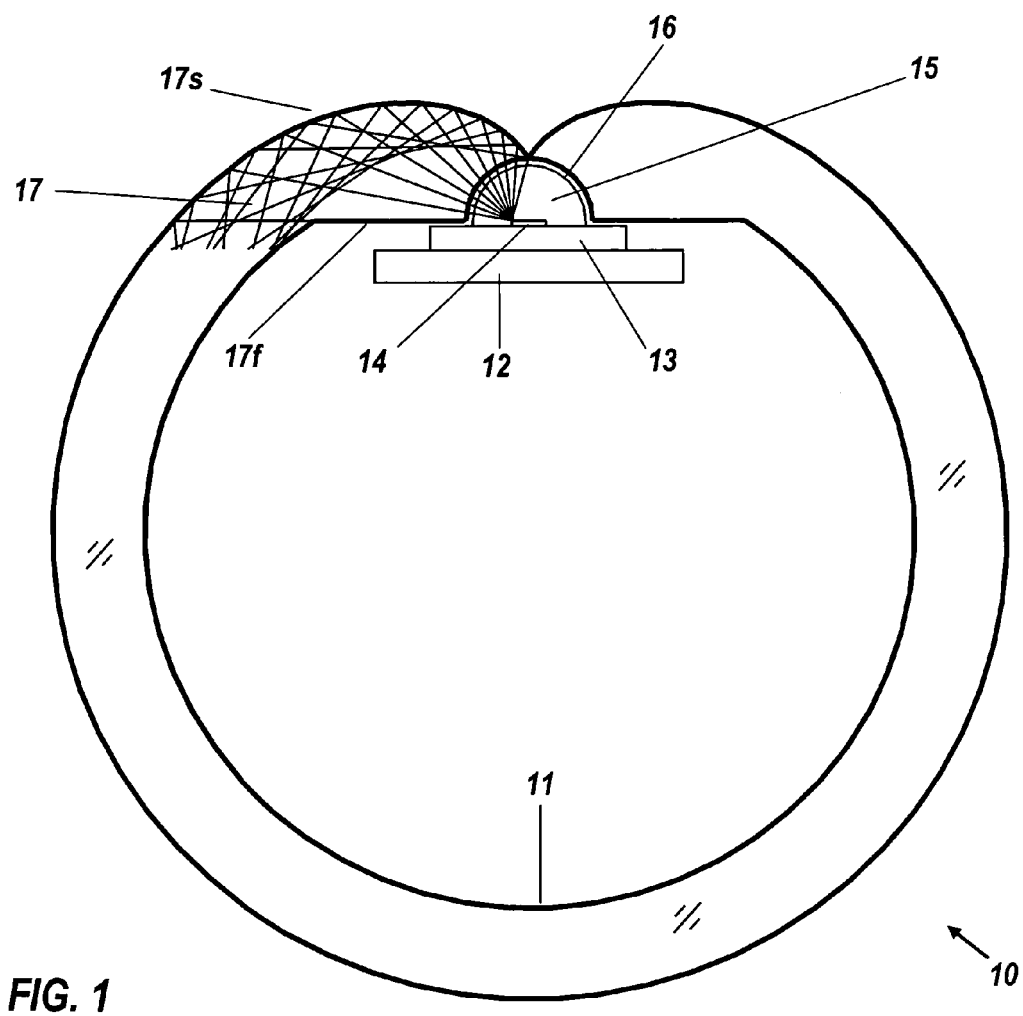
FIG. 1 shows a cross-section of an embodiment of an inside-fired annular waveguide.

Corresponding reference characters indicate corresponding components throughout the several views of the drawings.

FIG. 1 shows a cross-section of and embodiment of a tubular luminaire indicated generally by the reference numeral 10. Luminaire 10 comprises transparent hollow tube 11, circuit board 12, LED package 13, LED emitter chip 14, and transparent LED dome 15. Transparent hollow tube 11 comprises circular groove 16 surrounding dome 15, and injector section 17, bounded by upper spiral surface 17$s$ and a lower flat surface 17$f$. Also shown are some exemplary light rays emitted from the edge of chip 14. All light from chip 14 remains trapped within the wall of tube 11 by total internal reflection, until scattered out by either or both of two mechanisms, weak volume scattering or graded surface scattering. Light from the LEDs undergoes a high number of reflections per average path length. When using surface scattering for ejection, more reflections mean scattering sooner, with a greater chance for circumferential nonuniformity.

The interior space of tube 11 is hollow and typically simply contains air. If cooling for the LED chips 14 is desired, a fan or other air-moving device may be used to circulate cooling air along the interior space.

Figure 2:
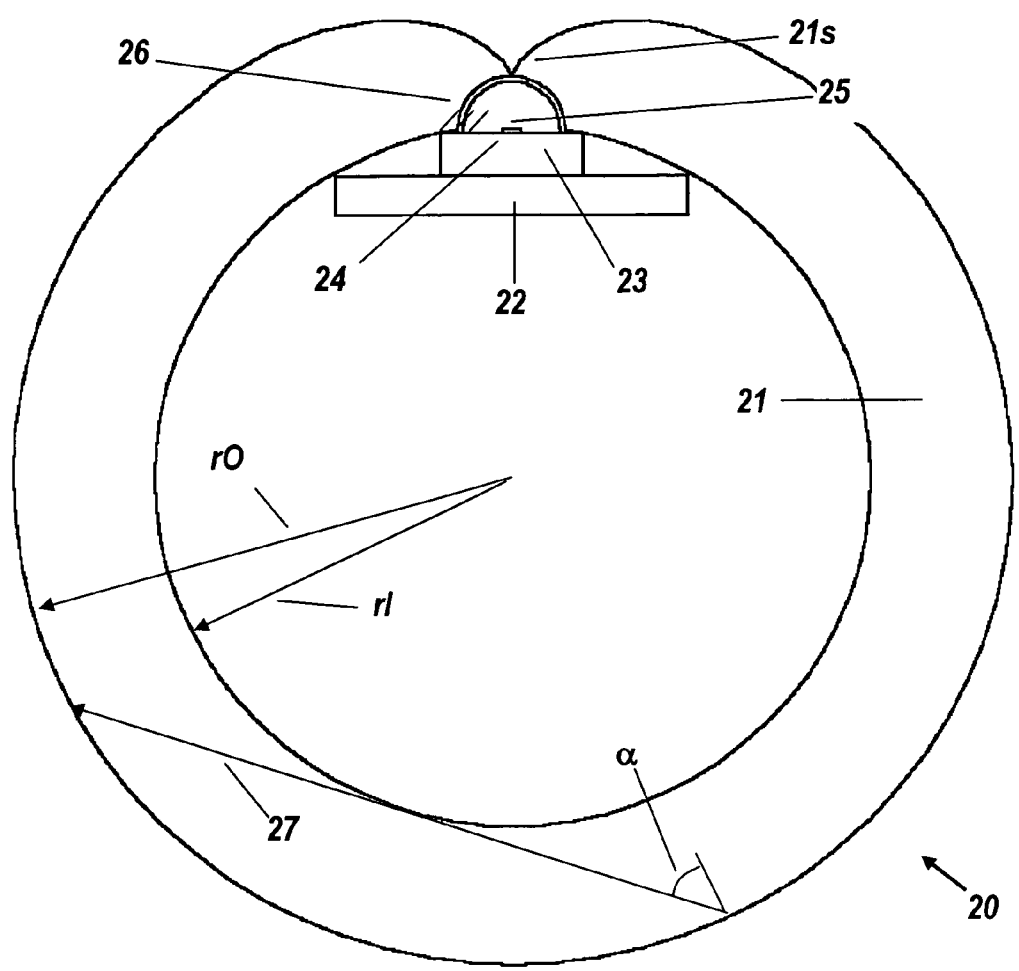
FIG. 2 shows a cross-section of another embodiment of an inside-fired annular waveguide with a greater relative wall thickness than in FIG. 1, for ease of extrusion.

FIG. 2 shows another embodiment of a tubular luminaire 20, comprising transparent hollow tube 21, internally positioned circuit board 22, LED package 23 mounted thereupon, and LED emitter chip 24 inside transparent LED dome 25. Hollow tube 21 is formed with circular groove 26 matching dome 25, and upper spiral surface 21$s$ above groove 26. Tube 21 has the maximum thickness as expressed by inner radius rI and outer radius rO such that $rI/rO = \sin \alpha$ where $\alpha$ is the minimum incidence angle, required to be greater than the critical angle of the transparent tube material. A 45° value is shown in FIG. 2. This assures that the light will remain within the tube as it propagates away from the LEDs before being scattered out. With the thinner tubes, some of the light will reflect off the inner wall by TIR is never perfect, and some light rays could be scattered outwards and refracted by the outer wall, and become visible to the viewer as a glowing inner wall, magnified by the curvature of the outer wall. The proper ratio of inner to outer diameter will make that magnified image just fill the apparent outer surface, so that the glowing inner wall is not separately distinguishable.

Thicker walls are easier to make, but heavier. In most cases, the thickness shown in FIG. 2, in which critical angle rays 27 are tangent to the inner wall, is the maximum desirable thickness. This is precisely the condition of all light from the inner wall escaping through the outer wall.

Figure 3:
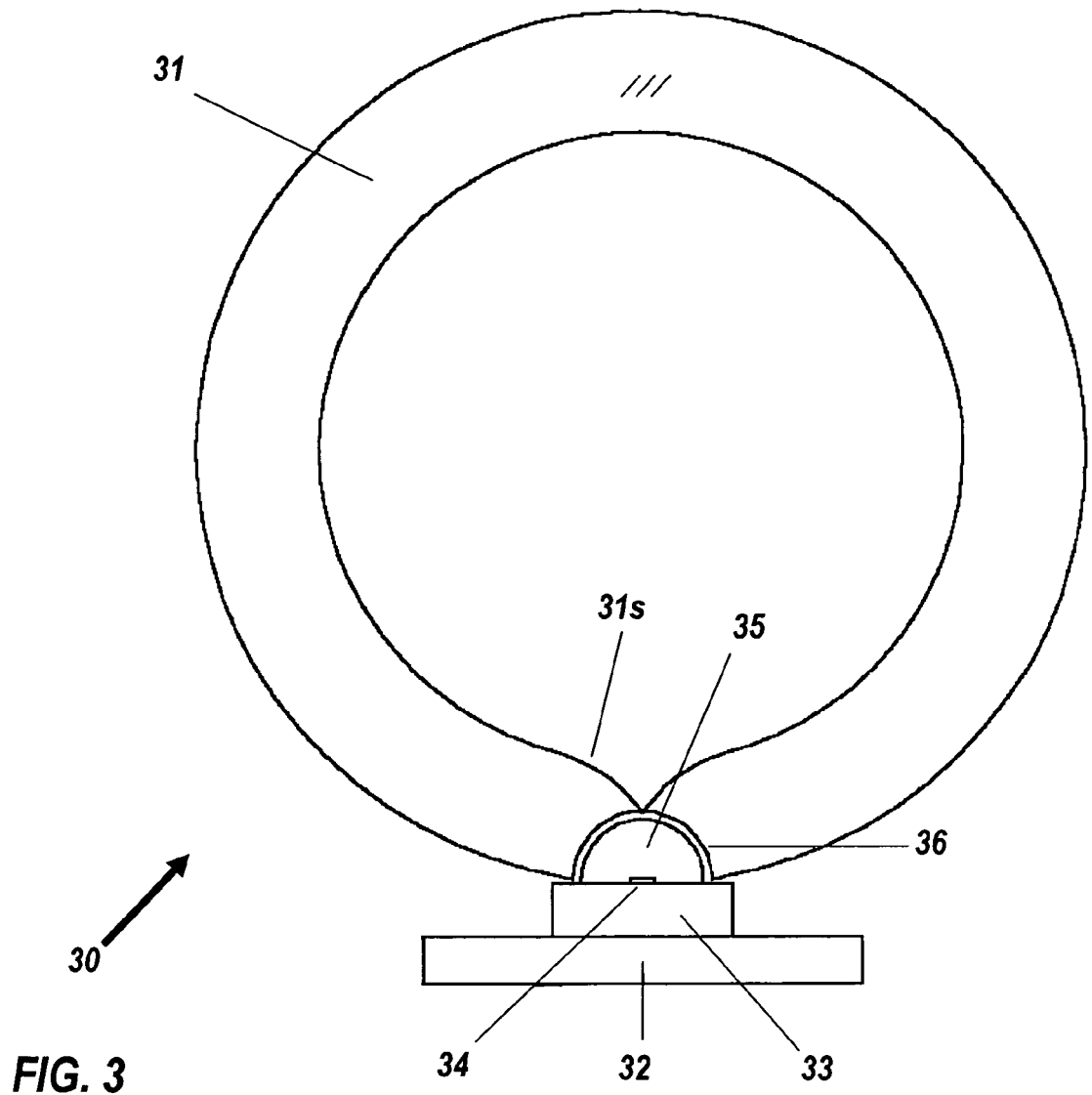
FIG. 3 shows a cross-section of an outside-fired annular waveguide with a minimum radius, relative to wall thickness.

FIG. 3 shows tubular luminaire 30, comprising transparent hollow tube 31, externally positioned circuit board 32, LED package 33 thereupon, LED emitter chip 34, transparent LED dome 35, circular groove 36 matching dome 35, and inner spiral surface 31$s$ above groove 36. The embodiment 30 of FIG. 3 is substantially the same as the embodiment of FIG. 2 except for having the LED assembly 32, 33, 34, 35 on the outside and the spiral surface 31$s$ on the inside. The embodiment of FIG. 3 has the advantage that the LED assemblies are easily accessible for assembly, power supply, and maintenance, but the embodiment of FIG. 2 has the advantage that the light emission is uninterrupted round the entire circumference of the tube 21. Internally illuminated embodiments such as that of FIG. 1 may be made up to a few feet (a meter or two) long, and may be used as accent lights. For greater lengths, it becomes increasingly difficult to insert the circuit board 12, 22 into the tube, and the externally illuminated embodiments may be preferred where a long continuous tube is desired.

The circuit board 32 may serve as, or may be attached to, a mount for mounting the luminaire 30 on a wall or other surface of an architectural structure.

The domed LEDs shown so far represent a common type, such as those commercially available from the Lumileds Corporation having a 5 mm dome-diameter. This size sets the scale for the entire luminaire. If the domes 15, 25, 35 have a 5 mm diameter, the tubes of FIG. 2 and FIG. 3 thus have an outer diameter of about 1.5" 38 mm, which is larger than most neon tubes.

One problem with the configuration of FIGS. 1 to 3 is the lack of material between circular groove 16, 26, 36 and the central cusp of spiral surface 21$s$, 31$s$, causing tube 31 to lack full rigidity. FIGS. 4 and 4A show a cross-section of a further embodiment of a tubular luminaire 40, comprising transparent hollow tube 41, externally positioned circuit board 42, LED package 43 thereupon, LED emitter chip 44, transparent LED dome 45, groove 46 matching dome 45, and inner spiral surface 41$s$ above groove 46. Luminaire 40 has an appreciable thickness of material between the groove 46 and the cusp 41$t$ of spiral surface 41$s$. As is best seen in the detail view in FIG. 4A, groove 46 has a V-top that causes light to miss the tip or cusp 41*t* between the spiral surfaces 41*s*, which cannot actually be manufactured without some fillet radius that would allow light to escape. Thickness 47 between the tip 41*t* and the V-top of groove 46 enables the tube material to form a single uninterrupted and rigid piece. Unfortunately, this also scales up the entire device, so that, if using the same 5 mm diameter LED domes mentioned above, the outer diameter of tube 41 has grown to two inches (50 mm), well outside the normal range of neon tubes.

In order to reduce device diameter to the half-inch (12 mm) range typical of neon tubes, a different LED may be used, one without a dome, so that the spiral injector can be smaller and closer to the LED. FIG. 5 and detail FIG. 5A show a cross-section through tubular luminaire 50, comprising transparent hollow tube 51, externally positioned circuit board 52, flat-top LED package 53 thereupon, LED top-emitting chip 54 optically coupled to the flat bottom of tube 51, with inner spiral surface 51*s* above it. The outer diameter of tube 51 is about half an inch (12 mm).

Figure 5B:
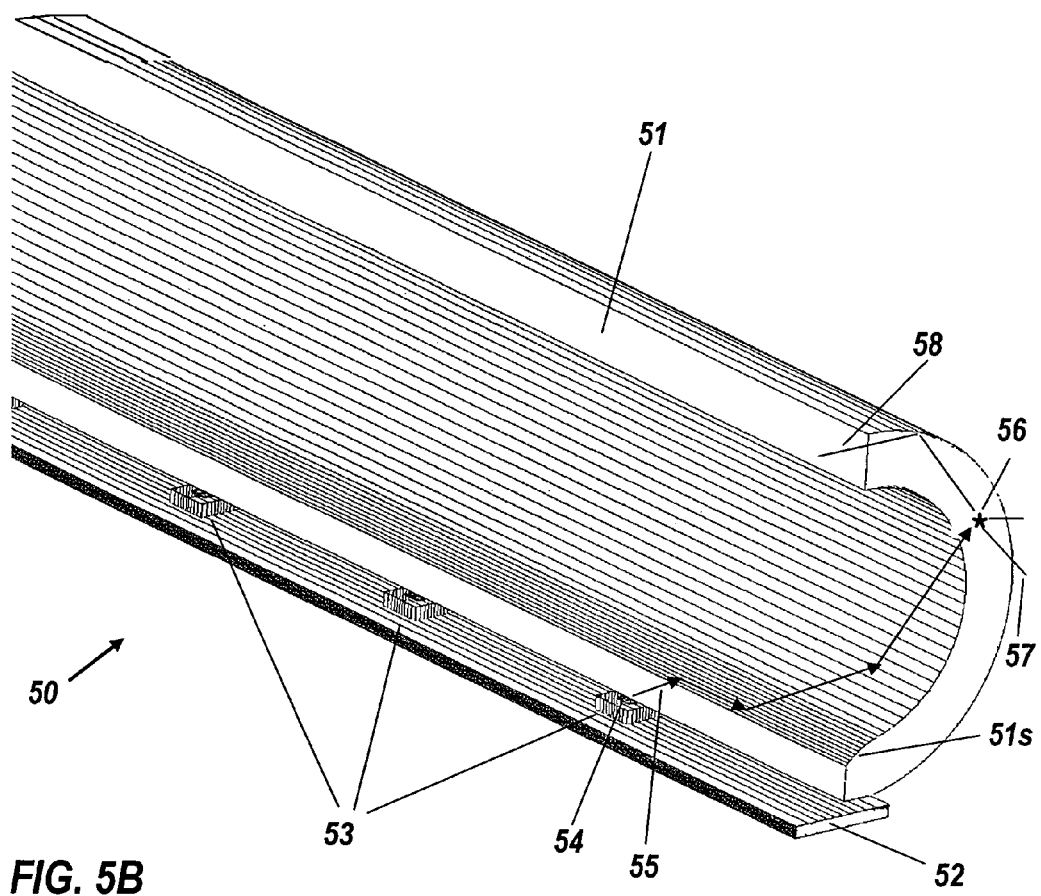
FIG. 5B is a sectioned perspective view of the waveguide shown in FIG. 5.

Regarding the neon-substituting light-emission that is a raison d'être of certain embodiments of the present invention, FIGS. 5, 5A, and FIG. 5B show exemplary ray 55 proceeding from emitting chip 54, bouncing numerous times in typical waveguide fashion, unable to break the radial symmetry of the annulus and escape (unless it should happen to encounter spiral 51*s*, after going all the way around tube 51). As mentioned above, light emission may be produced by an ejector scattering some of the rays. At exemplary scattering point 56, escaping ray 57 represents the half (approximately) that are scattered out, and trapped ray 58 the other half. If the concentration of scattering points 56 is uniform, a high rate of scattering will increase the proportion of rays that are scattered out, at the expense of uniformity, with areas near the LEDs 54 typically being brighter than areas on the opposite side of the tube 51. A low rate of scattering will give higher uniformity, but many rays will complete the circuit and return to spiral 51*s* and LED package 53, 54. Such returning rays may either be absorbed, reducing efficiency, or escape through spiral 51*s*, producing a bright streak.

It is possible for the extrusion process to create low volume-scattering near the line of LEDs, but increase the volume-scattering progressively in a circumferential direction to a maximum on the opposite side, to ensure that most of the light is scattered out before getting all the way around, while at the same time producing the homogeneity in the apparent brightness of the tube that is one of the desirable features of many embodiments of the present invention.

FIG. 5B shows a line of LEDs 53 spaced along the length of the luminaire 50, and shows how rays 55 propagating obliquely to the principal axes of the tube 51 can spread the light evenly over the length, as well as the circumference, of the tube. It will be understood that the other embodiments will typically have a similar arrangement along the length, although in most cases only a single cross-section perpendicular to the length of the tube is shown and, in the interests of clarity, exemplary rays in the plane of the drawing are shown.

Another method of producing uniform emission is an ejector in the form of a gradation of nanometer-scale surface roughening on either or both surfaces. This is more difficult to accomplish with extrusion, but might be worth the expense in some cases. Totally internally reflecting light, as in the tubular waveguide of the present invention, is especially sensitive to nanometer-scale roughness, which does not affect transmitted light, however.

Figure 6:
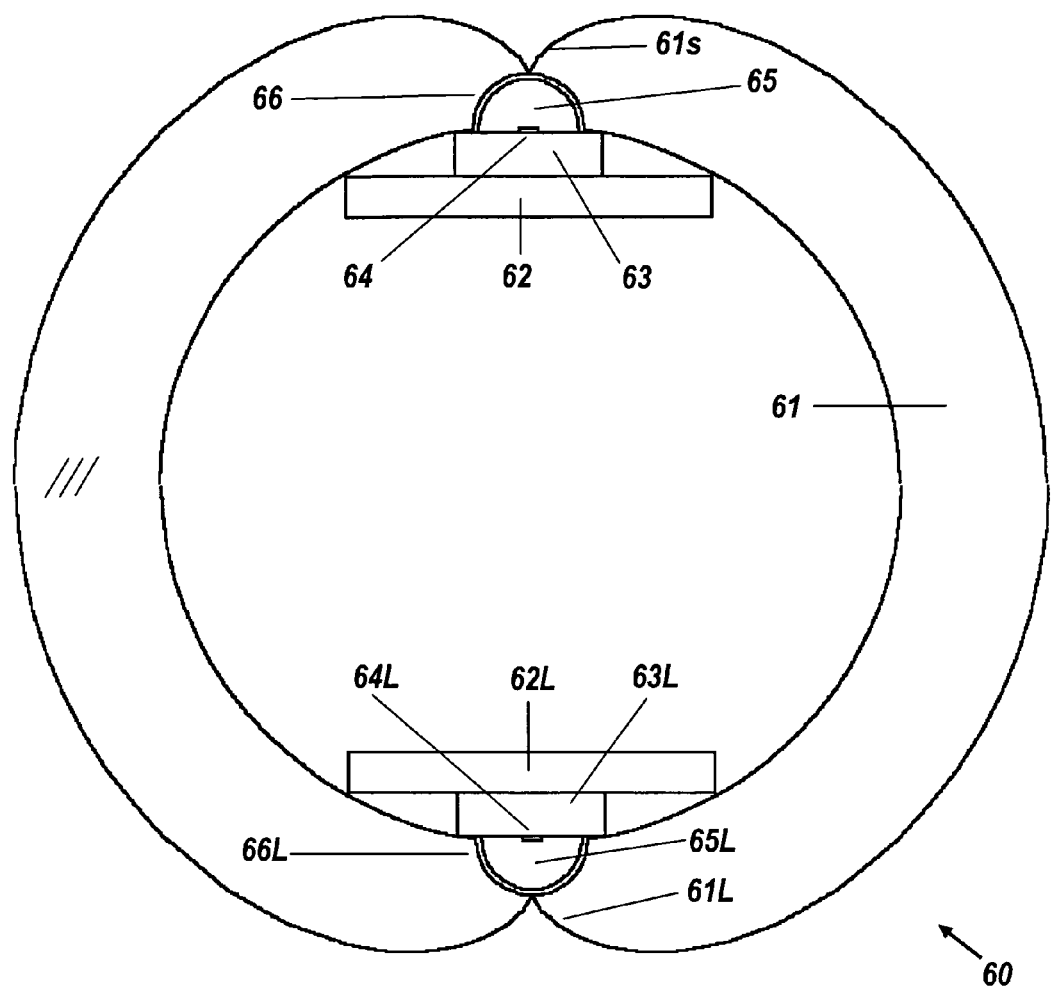
FIG. 6 shows a dual-source configuration.

It is possible to further augment the tubular luminaire with a second line of light sources and a second set of injection means. FIG. 6 shows tubular luminaire 60, comprising transparent hollow tube 61, internally positioned circuit board 62, LED package 63 mounted thereupon, LED emitter chip 64 inside transparent LED dome 65, circular groove 66 matching dome 65, and upper spiral surface 61*s* above groove 66, as well as lower circuit board 62L, lower LED package 63L mounted thereupon, second LED emitter chip 64L inside transparent LED dome 65L, lower circular groove 66L matching dome 65L, and lowermost spiral surface 61L below groove 66L. Assuming the spacing of LED packages 63 and the spacing of LED packages 63L are equal to the spacing of LED packages 23, and the two embodiments 20 and 60 are otherwise identical, this doubles the amount of light within waveguide 61 compared with waveguide 21. That augmentation is usually better suited to the internally illuminated luminaires 20, 60 than to luminaires 10, 30, 40, 50 because having two externally positioned circuit boards would obstruct a significant part of the exterior of the tubular luminaire.

Figure 7:
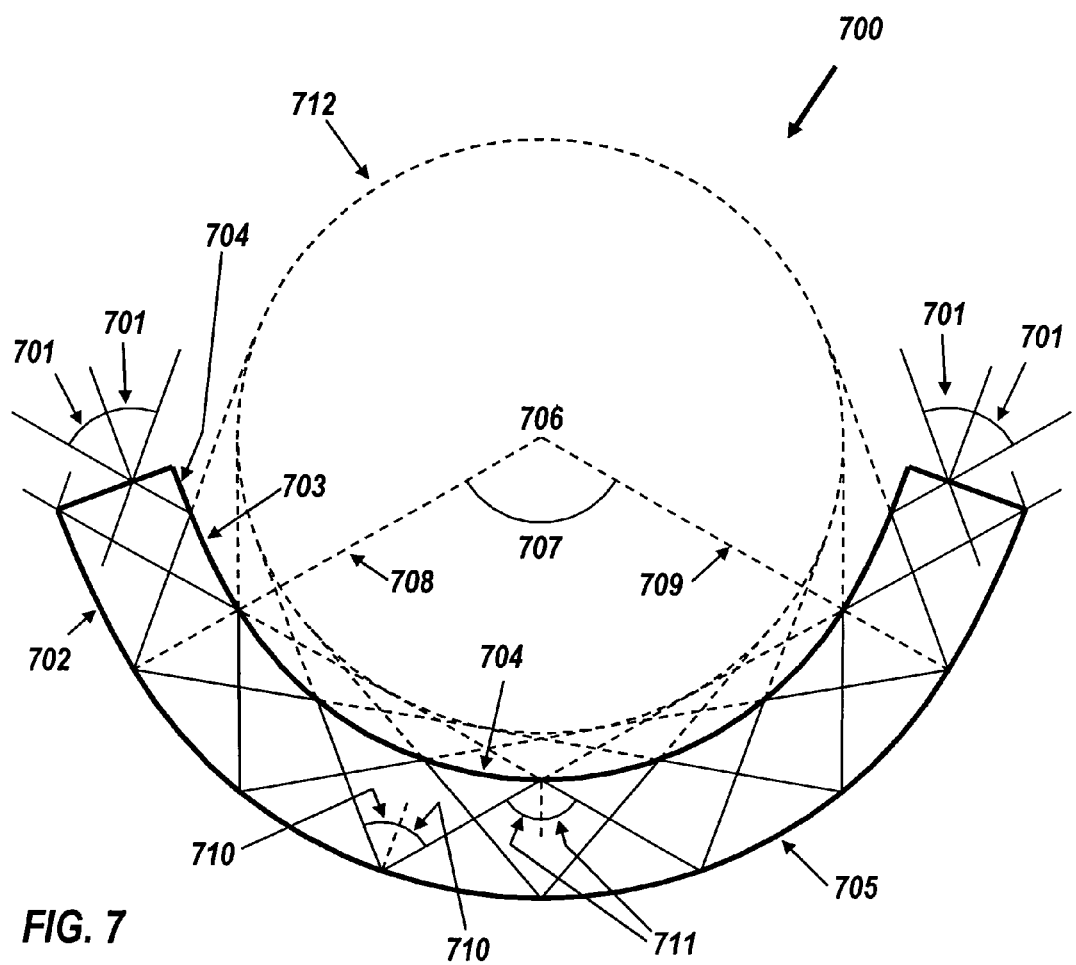
FIG. 7 shows a luminance transporter.

It is possible to inject light tangentially into an annular waveguide in such a way that all light remains within the waveguide unless some ejector acts upon it. Such a waveguide is also known as an angle rotator. FIG. 7 shows angle rotator 700 with acceptance and exit angle 701, such that light entering the rotator within the angle 701 of the normal to the entry face will remain guided within the interior of the rotator 700. The rotator 700 rotates light by an angle 707. Light enters the optic on the left confined by a flat mirror 704 and a macrofocal parabola 703 on one (inner) side and a macrofocal parabola 702 on the other side, both with macrofocus 712. Between section lines 708 and 709, light is confined by circular arcs 704 and 705, both with center 706. The injection of light into this section by macrofocal parabolas 702 and 703 is such that edge rays are reflected at the outer surface 705 with angle 710 and at the inner surface 704 with angle 711. Rotation angle 707 for end-injected light can be chosen freely by extending circular arcs 704 and 705.

If it is not desired to have light emitted from the whole circumference of the luminaire, part of the transparent hollow tube could be formed as an angle rotator 700. For example, if the luminaire will be viewed only from a narrow angle, so that one side (the "back" side) will never be seen by viewers, it may be more efficient to mount the LEDs at the back, and use angle rotators to conduct the light to the point, less than 90° from the LEDs, by an amount depending on the viewing angle, where the surface of the luminaire becomes visible and useful ejection of radiation starts.

Figure 8:
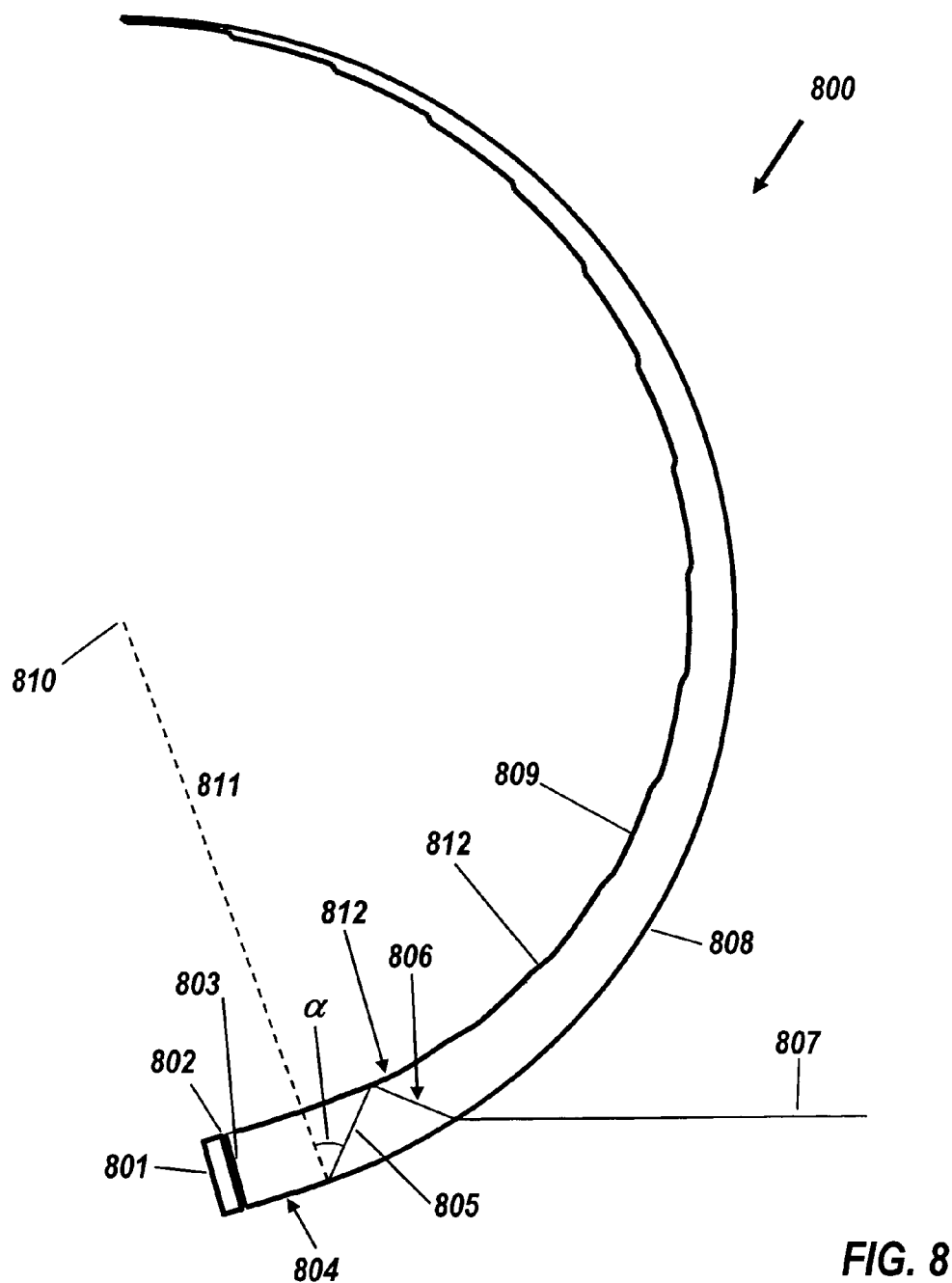
FIG. 8 shows a tapering annular waveguide.

FIG. 8 shows a tapering annular waveguide 800 with ejection features. Hemispheric light is emitted by source 801 and propagates across narrow air gap 802, encountering end wall 803, which refracts the light so it is confined within the critical angle α and will remain guided within the waveguide. Macrofocal parabola 804 then redirects the edge rays into the remaining part of the light guide to the right of section line 811. To the right of section line 811, light is confined on the outside by circular arc 808 with center 810, and on the inside by inner flow lines 809 (also circular with center 810) and ejectors in the form of extraction features 812. The angle with which the edge rays hit outer surface 808 is the critical angle $\alpha = \sin^{-1}(1/n)$ of the material of the light guide. This angle corresponds to angle 701 in FIG. 7. Extraction features 812 are designed so that exemplary ray 805 that has been reflected at the critical angle α at the outer surface 808 is reflected at 812 in a direction 806 such that, after refraction at the outer surface 808, the light comes out in a given direction 807. The result of this is that light refracted at surface 808 comes out confined by direction 807 and the tangent to 808. Although in this example there is an air gap 802 between the source 801 and the light guide, similar devices can be designed, using the general principles of nonimaging optics, without such an air gap.

Figure 9:
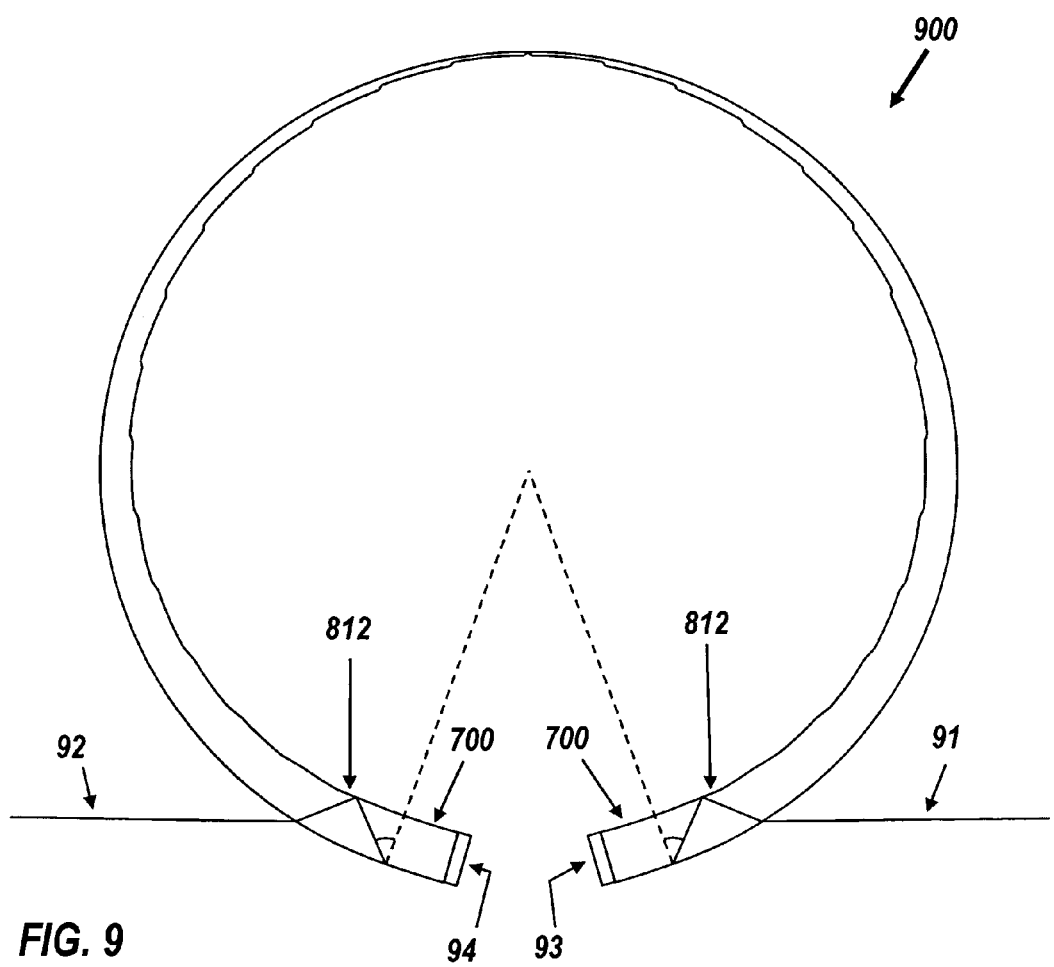
FIG. 9 shows two of the waveguide shown in FIG. 8 combined into a single source.

FIG. 9 shows two light guides such as that of FIG. 8 combined into a single light-emitting tube 900. The resulting emission pattern is such that light exiting the tube is limited angularly by direction 91 and the tangent to the tube and by direction 92 and the tangent to the tube. As shown in FIG. 9, the end of angle rotator 700 and the first extraction feature 812 are positioned so that the limiting rays 91, 92 from the first extraction feature on each side form an angle of approximately 180°, within which the overall light emission of the tube 900 is confined. Subsequent extraction features 812 are more prominently shaped, so that the limiting ray from each subsequent extraction feature 812 is parallel to rays 91, 92 and at a greater angle to the local tangent. There are two light sources 93 and 94, one on each side. The tip edges of the two waveguides 800 may be joined together for rigidity and structural strength.

Figure 10:
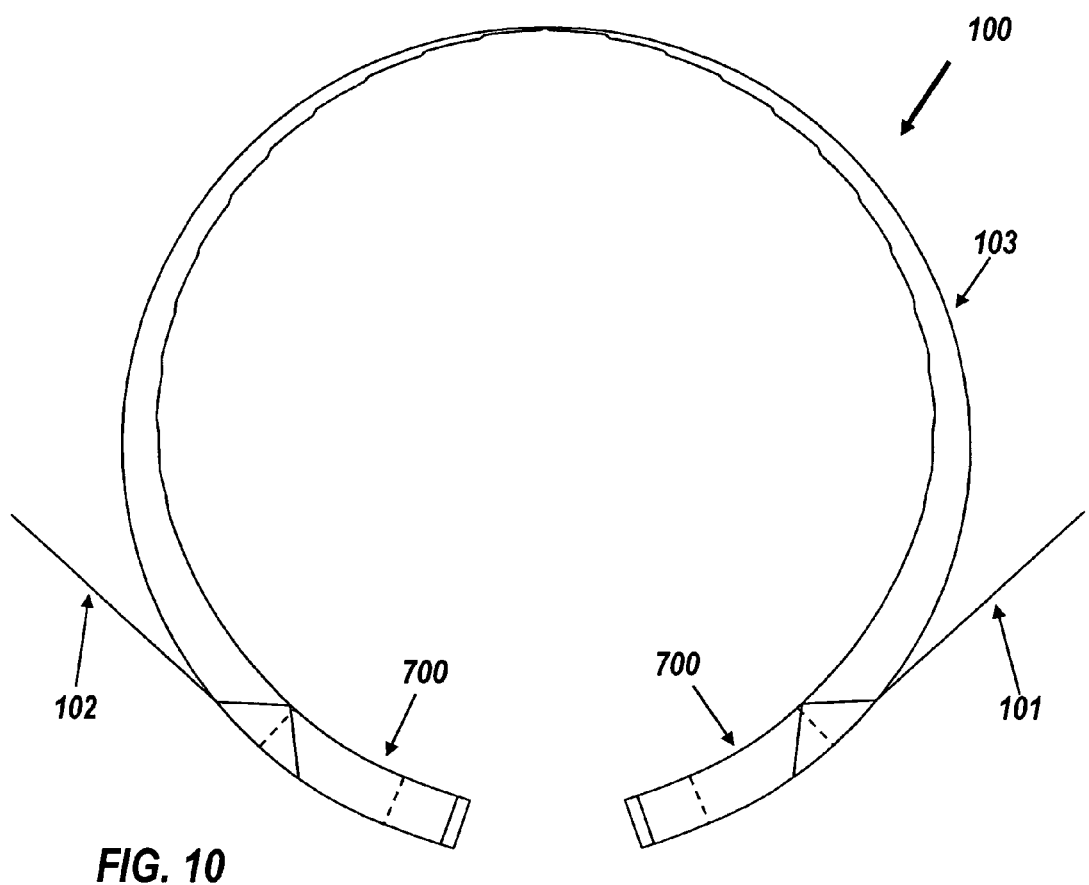
FIG. 10 shows a similar configuration to FIG. 9.

FIG. 10 shows an optic 100 comprising annular tube 103 similar to that in FIG. 9 but in which the angle rotator section 700 is longer than angle rotator section 804 in FIG. 8, and light emission is now confined by symmetric directions 101 and 102 making an angle of approximately 90° to each other. Just as before, at each point on the exit surface of the optic 103, light emission is confined between direction 101 and the tangent to that surface.

In fiber optic devices there is an outer lower-index layer called the cladding, a feature that can be utilized for the present invention. Especially suitable for this role are fluoropolymer species, including PTFE (Polytetrafluoroethylene), FEP (Fluorinated ethylenepropylene), PFA (Perfluoroalkoxy), ETFE (Ethylene tetrafluoroethylene). They appear as clear to milky white color in their natural, unpigmented state. The clearest fluoropolymer resin is PFA HP, which allows for a high level of light transmission. FEP is quite clear as well, while PTFE material tends to be more milky in color. Levels of clarity can be modified to some extent by different processing methods and through the use of a variety of resin grades. Numerous fillers are available to alter mechanical or chemical properties, including photoluminescent phosphors. If the LEDs of the presently described devices are blue, a phosphor cladding that converts some of the blue light to emit yellow light may be used. With the proper thickness and density, such a phosphor cladding would produce white light. Alternatively, a line of ultraviolet LEDs could operate in conjunction with the same type of white phosphor as in conventional fluorescent lamps.

The main annular waveguide tube 103, like the annular waveguides in the other embodiments, may be made of any suitable transparent material, including flexible plastic materials already known for fiber optic illuminators. These materials include flexible acrylics, as well as vinyl. It is well known to materials science how to alter acrylic formulations so as to confer flexibility sufficient for the cross-sections of the Figures to follow space curves, such as draped around a Christmas tree. The art of fiber optic illumination also includes transparent plastics of lower refractive index used as cladding. Vinyls and silicones offer numerous candidates for this role. It will be understood by a skilled practitioner of the art of fiber optic illumination how to use flexible materials, and to include a cladding, on any of the preferred embodiments the cross-sections of which are disclosed herein.

Figure 11:
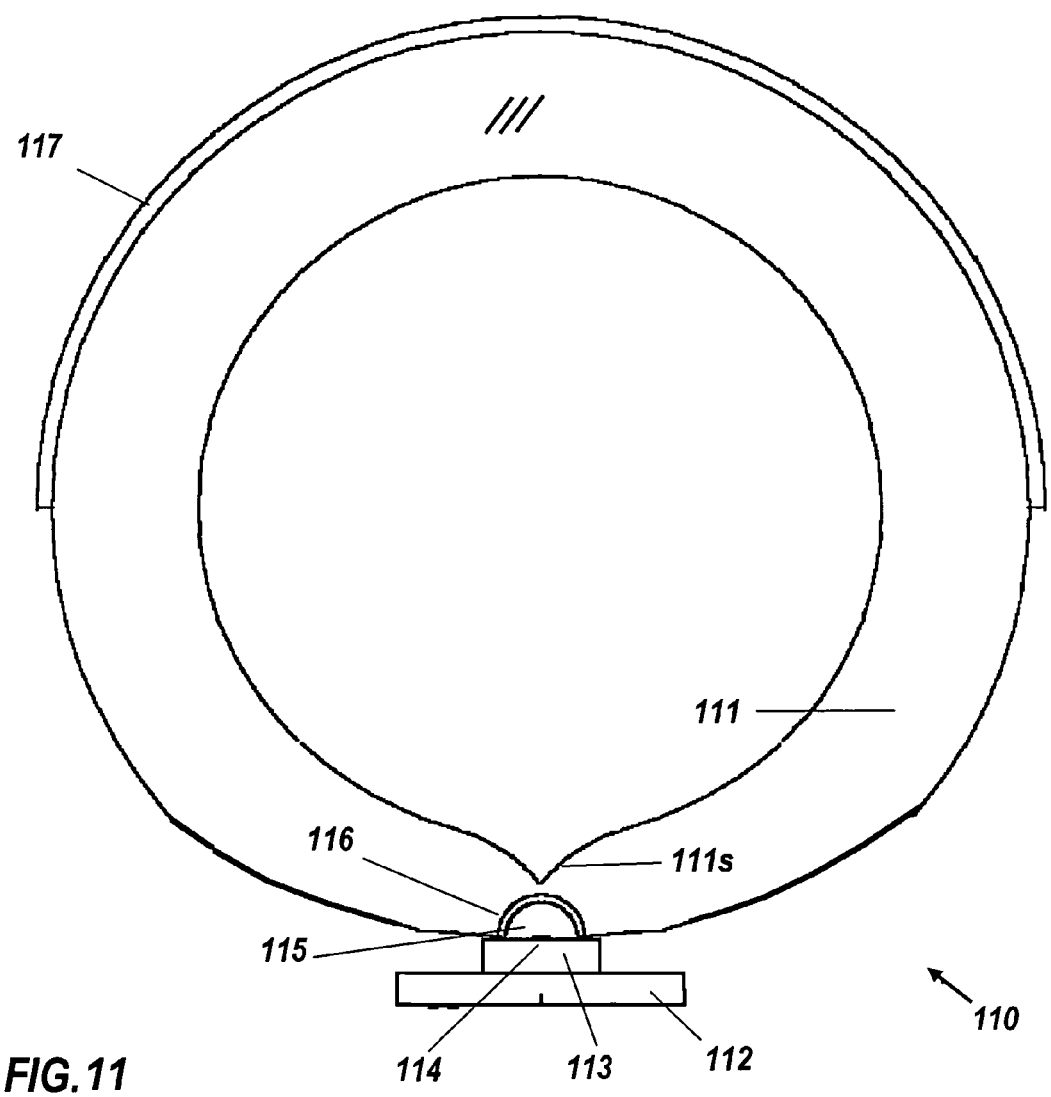
FIG. 11 shows a configuration with an external phosphor cladding.

FIG. 11 shows luminaire 110, comprising transparent annular cylindrical waveguide 111 with spiral reflector section 111s, LED with base 112, package 113, emitting chip 114, and dome 115. On the profile of waveguide 111 is circular section 116 for receiving light from dome 115. Atop waveguide 111 is phosphor-impregnated cladding layer 117, covering the top half of waveguide 111 and emitting converted light in all directions. By covering only half of waveguide 111 the emission of cladding 117 is biased upwards.

The line of LEDs of the present invention are suitable for the usual temporal controls long known in the lighting industry, controls that were pioneered in Las Vegas in the 1950's with incandescent lights. In the case of LEDs, however, electronics replace the old rotary switches. For example, the line of LEDs of the present invention can be controlled by DMX (Digital MultipleX, a practice from the 1980's which became a standard in 1990. Its current 2004 standard is incorporated as a reference and listed as such.

The LEDs of the present invention can as well be controlled by a variety of electronic signal protocols, particularly Ethernet, DALI, TCP/IP, HTTP, XML, Bluetooth, and 802.11 wireless.

It has long been known that LEDs can have their overall flux controlled by pulse-code modulation (PCM) or pulse-width modulation (PWM), originally established in the 1970's by the inventors of the LED themselves. Numerous applications of this technique have been taught in the prior art. PWM makes it possible in the present devices to control individual LEDs to generate pleasing traveling-wave patterns as well as static or slowly changing color of the entire length of an accent light, by the use of RGB or RBGY multiple-wavelength lamps.

Certain embodiments of the present devices differ from the prior art, however, in that the mixing of the LED light by the ejector of the annular configuration makes possible colorimetric gradients along the tube, between two lamps of different colors, that would be more pleasing to the human eye than anything attainable in the prior art. Luminaires with independently controllable light sources, including light sources of different colors, and including luminaires provided with, or equipped to cooperate with, electronic control systems to produce these or other lighting effects, are within the scope of the present invention as defined in the claims of the present application.

Luminaires in accordance with embodiments of the present invention are of course suitable for customized lettering and symbology, as is already done with neon tubes. The lettering may be formed by curved tubes, straight tubes, or successive curved and straight runs. The tubes may be flexible, or may be rigid and preformed to a desired shape, or may be softenable or plasticly deformable but then hold their shape rigidly in normal use. Commercially available flexible LED connectors can take the place of the circuit boards 52 in such a configuration, especially in curved runs or continuous sections of tube that include curved runs. This long-established and open prior art is claimed by the present invention solely as used with the annular tube configurations disclosed herein. As with the linear configurations mentioned above, the degree of homogenization attained by the present invention enables the creation of pleasing multicolor displays along the length of the annular tubing of the present invention forming a particular emblem or symbol.

In the foregoing description, terms of relative position such as "top" and "bottom" have been used for convenience with reference to the positions of features shown in the drawings. The devices shown are not required to be installed or operated in those specific orientations, and the positional language is not to be understood as limiting.

Although specific embodiments have been described, the skilled reader will understand how features of different embodiments may be combined and substituted, and such combinations are within the scope of the present invention.

For example, the flat-topped LED package 52, 53, 54 shown in FIGS. 5 and 5A can be used in the luminaires shown in FIGS. 1, 2, 3, 4, 6, and 11. For example, the added wall thickness 47 shown in FIG. 4A can be used in the luminaires shown in FIGS. 1, 2, 3, 6, and 11. The skilled reader will understand how to make the appropriate consequential changes to each embodiment to enjoy the advantages of those additional features.

The following U.S. PATENT DOCUMENTS are herein incorporated by reference in their entirety:

| | | |
|---|---|---|
| 4,519,046 | Cole | 708/816 |
| 5,634,711 | Kennedy, et al. | 362/119 |
| 5,924,784 | Chliwnyj, et al. | 362/234 |
| 6,238,067 | Hirsch. | ..362/352 |
| 6,292,901 | Lys, et al. | 713/300 |
| 6,400,101 | Biebl, et al. | 315/291 |
| 6,411,046 | Muthu | 315/309 |
| 6,488,397 | Matsutani, et al. | 362/551 |
| 6,497,496 | Wang | 362/249 |
| 6,510,995 | Muthu | 235/454 |
| 6,548,967 | Dowling, et al | 315/318 |
| 6,567,009 | Ohishi | 340/815.45 |
| 6,583,791 | Berryman, et al. | 345/589 |
| 6,676,284 | Wilson | 362/555 |
| 6,683,419 | Kriparos | 315/224 |
| 6,720,745 | Lys | 315/312 |
| 6,747,420 | Barth, et al. | 315/291 |
| 6,788,011 | Mueller | 315/294 |
| 6,834,979 | Cleaver | 362/219 |
| 6,836,079 | Hong | 315/291 |
| 6,874,924 | Hulse, et al. | 362/551 |
| 6,965,205 | Piepgras, et al | 315/318 |
| 6,987,787 | Mick | 379/29.021 |
| 6,989,701 | Lin, et al. | 327/175 |
| 7,014,336 | Ducharme, et al. | 362/231 |
| 7,015,825 | Callahan | 340/815.45 |
| 7,048,413 | Fan | 362/249 |
| 7,067,995 | Gunter | 315/312 |
| 7,277,618 | Yamazaki, et al. | 385/123 |
| 2004/0,239,257 | Yang | 315/169.3 |
| 2005/0,116,922 | Kim | 345/102 |
| 2005/0,162,851 | Kazar, et al. | 362/231 |
| 2005/0,217,457 | Yamamoto, et al. | 084/464 |
| 2005/0,243,041 | Vinn | 345/082 |
| 2006/0,006,821 | Singe, et al. | 315/312 |
| 2006/0,017,409 | Hsieh | 315/360 |
| 2006/0,022,214 | Morgan, et al. | 257/99 |
| 2006/0,091,826 | Chen | 315/291 |
| 2006/0,109,137 | Callahan | 340/815.45 |
| 2006/0,170,373 | Yang | 315/209 |
| 2006/0,193,357 | Pruett | 372/38.07 |

The following other document is herein incorporated by reference in its entirety:
ESTA Publication, *Entertainment Technology—USITT DMX*512-*A—Asynchronous Serial Digital Data Transmission Standard for Controlling Lighting Equipment and Accessories,* American National Standards Institute, 2004

The preceding description of the presently contemplated best mode of practicing the invention is not to be taken in a limiting sense, but is made merely for the purpose of describing certain general principles of the invention. The full scope of the invention should be determined with reference to the Claims.

What is claimed is:

1. A tubular luminaire comprising:
a line of discrete light sources; and
cylindrical transparent annular waveguide;
said waveguide comprising a receiving zone, said zone receiving the light of said sources so as to admit said light within said transparent material of said annular waveguide;
said waveguide comprising an ejector to promote the homogeneous escape of said light from said waveguide;
wherein said receiving zone is along a portion of the circumference of said waveguide;
said annular waveguide further comprising a bilaterally symmetric spiral wall opposing said receiving zone and in turn receiving light from said receiving zone, said spiral wall laterally reflecting said light so as to keep said light within said waveguide.

2. The luminaire of claim 1, wherein said bilaterally symmetric spiral wall has a profile that is locally sloped to operate by total internal reflection of said light received from said receiving zone.

3. The luminaire of claim 1, wherein said light sources are positioned externally, and said luminaire comprises provision associated with said light sources for mounting on the surface of an architectural structure.

4. The luminaire of claim 1, wherein said receiving zone is on the inner circumference of said annular waveguide and said line of light sources are inside the hollow space within the inner circumference of said annular waveguide.

5. The luminaire of claim 4, wherein said light sources are cooled by circulation of air within the hollow interior space of said waveguide.

6. The luminaire of claim 1, wherein said receiving zone is on the outer circumference of said annular waveguide and said line of light sources are exterior to said annular waveguide.

7. A tubular luminaire according to claim 1, wherein said receiving zone is flat and extends across the width of said annular waveguide.

8. The luminaire of claim 1, also comprising a second line of light sources and a second receiving zone for light from the second line of light sources.

9. The luminaire of claim 1, wherein said light sources are domed hemispherical emitters and said receiving zone is a groove with a concave cross-section matching the shape of said domed light sources.

10. The luminaire of claim 1, wherein said light, sources are hemispherical emitters that are both top-emitting and flat-windowed, and said receiving zone is planar.

11. A tubular luminaire comprising:
a line of discrete light sources; and
a cylindrical transparent annular waveguide;
said waveguide comprising a receiving zone, said zone receiving the light of said sources so as to admit said light within said transparent material of said annular waveguide;
said waveguide comprising an ejector to promote the homogeneous escape of said light from said waveguide;
wherein the ratio of inner diameter to said outer diameter of said annular waveguide is such that the solid width of the annulus is the product of the index of refraction of said material and the luminous diameter of each of said light sources.

12. A tubular luminaire comprising:
a line of discrete light sources; and
a cylindrical transparent annular waveguide;
said waveguide comprising a receiving zone, said zone receiving the light of said sources so as to admit said light within said transparent material of said annular waveguide;

said waveguide comprising an ejector to promote the homogeneous escape of said light from said waveguide;

wherein said annular waveguide has a ratio of inner diameter to outer diameter greater than the sine of the critical angle of the transparent material of said waveguide.

13. The luminaire of claim 1, wherein said light sources comprise photostimulative LEDs and wherein said tubular waveguide also comprises an outer phosphor-impregnated cladding of lower refractive index than the material of said tubular waveguide.

14. The luminaire of claim 1, wherein said annular waveguide hasa thickness that tapers away from said receiving zone.

* * * * *